United States Patent
Roeland

(10) Patent No.: US 9,907,100 B2
(45) Date of Patent: *Feb. 27, 2018

(54) METHOD AND APPARATUS FOR ESTABLISHING AND USING PDN CONNECTIONS

(71) Applicant: TELEFONAKTIEBOLAGET LM ERICSSON (PUBL), Stockholm (SE)

(72) Inventor: Dinand Roeland, Sollentuna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/283,824

(22) Filed: Oct. 3, 2016

(65) Prior Publication Data

US 2017/0027007 A1    Jan. 26, 2017

Related U.S. Application Data

(63) Continuation of application No. 13/700,860, filed as application No. PCT/EP2012/071658 on Nov. 1, 2012, now Pat. No. 9,497,786.
(Continued)

(51) Int. Cl.
*H04W 76/02* (2009.01)
*H04W 40/02* (2009.01)
(Continued)

(52) U.S. Cl.
CPC ......... *H04W 76/021* (2013.01); *H04W 40/02* (2013.01); *H04W 76/026* (2013.01);
(Continued)

(58) Field of Classification Search
CPC . H04W 76/021; H04W 40/02; H04W 76/026; H04W 88/06; H04L 61/6022; H04L 61/2007

See application file for complete search history.

(56) References Cited

U.S. PATENT DOCUMENTS 9,497,786 B2 *  11/2016  Roeland
2005/0007995 A1   1/2005  Inoue
(Continued)

FOREIGN PATENT DOCUMENTS

| WO | WO 2009/083429 A1 | 7/2009 |
| WO | WO 2010/076043 A1 | 7/2010 |
| WO | WO 2070/088953 A1 | 8/2010 |

OTHER PUBLICATIONS

Huawei. PDN Connection Identifier Handling. 3GPP Draft; S2-084525. $3^{Rd}$ Generation Partnership Project (3GPP). Mobile Competence Centre' 650 Route des Lucioles; Sophia-Antipolis Cedex, France. vol. SA WG2. Jun. 18, 2008.
(Continued)

*Primary Examiner* — Mohammad Anwar

(57) ABSTRACT

A method is described of establishing and/or using a plurality of packet data network connections between a user equipment and a 3GPP core network via a gateway node in a non-3GPP access network, comprising using a different device identifier for each packet data network connection of the plurality, or at least for each packet data network connection of the plurality that is associated with the same IP address, to distinguish between the packet data network connections of the plurality or to allow such a distinction to be made, wherein the device identifier used to distinguish between the packet data network connections of the plurality is a device identifier associated with the user equipment, or a device identifier associated with the gateway node in the non-3GPP access network, or a combination of these. The device identifier may be a MAC address.

19 Claims, 10 Drawing Sheets

Related U.S. Application Data

(60) Provisional application No. 61/555,758, filed on Nov. 4, 2011.

(51) Int. Cl.
  *H04W 88/06* (2009.01)
  *H04L 29/12* (2006.01)
(52) U.S. Cl.
  CPC ...... *H04L 61/2007* (2013.01); *H04L 61/6022* (2013.01); *H04W 88/06* (2013.01)

(56) References Cited

U.S. PATENT DOCUMENTS

| | | |
|---|---|---|
| 2008/0254768 A1 | 10/2008 | Faccin |
| 2009/0303966 A1 | 12/2009 | Cherian et al. |
| 2010/0290391 A1 | 11/2010 | Cheng et al. |
| 2012/0163264 A1 | 6/2012 | Chu et al. |

OTHER PUBLICATIONS

3GPP. 3rd Generation Partnership Project; Technical Specification Group Services and System Aspects; Study on S2a Mobility based on GTP & WLAN Access to EPC (SaMOG); Stage 2 (Release 11). 3GPP TR 23.852 v0.4.0 (Oct. 2011).

3GPP. 3rd Generation Partnership Project; Technical Specification Group Services and System Aspects; Study on Support of BBF Access Interworking (Release 11)3GPP TR 23.839 v1.0.0 (Jun. 2011).

3GPP. 3rd Generation Partnership Project; Technical Specification Group Services and System Aspects 3GPP System-Fixed Broadband Access Network Interworking; Stage 2 (Release 11) 3GPP TS 23.139 v1.0.0 (Aug. 2011).

3GPP. 3rd Generation Partnership Project; Technical Specification Group Services and System Aspects; Architecture Enhancements for Non-3GPP Accesses (Release 9). 3GPP TS 23.402 v9.10.0 (Sep. 2011).

Broadband Forum. WT-203 Interworking between Next Generation Fixed and 3GPP Wireless Access. Draft. Revision: Aug. 9, 2011.

* cited by examiner

METHOD AND APPARATUS FOR ESTABLISHING AND USING PDN CONNECTIONS

RELATED APPLICATIONS

This application is a continuation of U.S. application Ser. No. 13/700,860, filed on Nov. 29, 2012, which was the National Stage of International Application No. PCT/EP2012/071658, filed Nov. 1, 2012, which claims the benefit of U.S. Provisional Application No. 61/555,758, filed Nov. 4, 2011, the disclosure of which is incorporated herein by reference.

TECHNICAL FIELD

The present disclosure relates to a method and apparatus relating to a scheme in which a mobile terminal connects to a 3GPP core network (or equivalent) via a non-3GPP (or equivalent) access network. The present disclosure finds particular use in establishing and using a packet data network connection from a user equipment to a 3GPP core network via a non-3GPP access network, and particularly for distinguishing between a plurality of such packet data network connections. The method finds particular use in Fixed Mobile Convergence.

BACKGROUND

The Third Generation Project Partnership (3GPP) has developed the System Architecture Evolution (SAE) as the core network architecture of its future and Long Term Evolution (LTE) wireless mobile telecommunications standard. The main component of the SAE architecture is the Evolved Packet Core (EPC; see "Architecture enhancements for non-3GPP Accesses," 3GPP TS 23.402). The LTE/SAE network includes network entities supporting the user and control planes.

An ongoing trend within telecommunications is the convergence of fixed and mobile networks, which is known as Fixed Mobile Convergence (FMC). The trend of evolving networks using IP-based technologies is common for fixed and mobile networks, which makes the convergence easier. Through FMC, mobile and fixed network operators will be able to utilize their network resource more efficiently, which leads to reduction of capital and operational expenditure (CAPEX and OPEX). For instance, when a user is running an IP-based application such as Multimedia Telephony (MMTel) inside their home, it is more efficient to utilize broadband connectivity of the fixed access network rather than the wireless access network.

Residential networks have been important to the success of FMC because they are the most commonly used fixed network access by ordinary users. Therefore, it is important to be able to connect mobile phones to the Evolved Packet Core (EPC) through a residential network. The term User Equipment (UE) is used interchangeably herein in place of the term mobile terminal or mobile phone, or even just terminal or device. The term UE is familiar in the 3rd Generation Partnership Project (3GPP) documentation, and is intended to refer to any piece of equipment that is configured to access the internet; it would include, for example and without limitation, mobile telecommunication devices, portable or handheld computing devices and desktop or installed computers. However, for the purposes of this disclosure and the inventive techniques described herein, the term is not necessarily limited to devices that support 3GPP standards.

3GPP defines mobile 2G/3G/LTE accesses and "non-3GPP accesses" (TS 23.402). The latter can be a fixed network. The BBF (BroadBand Forum, the standardization organization for the fixed access; see http://www.broadband-forum.org/) defines an architecture for fixed networks. There is an ongoing joint work item on FMC between these two organizations [3GPP TR 23.839, now moving into TS 23.139, and BBF WT 203]. Many UEs address the FMC trend by providing multiple radio interfaces: one interface to connect to a 2G/3G/LTE access and a WiFi interface to connect to a fixed network.

There are a number of ongoing work items on Fixed Mobile Convergence (FMC). In FMC, a dual-radio UE is generally assumed. The UE has one radio interface for the 3GPP access (e.g. LTE), and one radio interface for the fixed access (e.g. WiFi). In 3GPP, "Study on Support of BBF Access Interworking" (BBAI) covers interworking between 3GPP (the standardization organization for mobile networks) and BBF (the standardization organization for fixed networks) [3GPP TR 23.839, TS 23.139, BBF WT 203].

Additional standardization activities are ongoing in the WiFi Alliance. In the WiFi Alliance, one of the focus areas is (public) hotspots. Therefore, in addition to the residential networks described above, hotspots are increasingly becoming key to the success of FMC, and there is a work item in 3GPP called SaMOG (Study on S2a mobility based on GTP & WLAN access to EPC; see 3GPP TR 23.852 at http://www.3gpp.org/ftp/Specs/html-info/23852.htm). SaMOG is specific to S2a, but not specific to BBF.

A 3GPP UE can attach to a non-3GPP access network and connect to one or more Packet Data Networks (PDNs) via the S2 interface [3GPP TS 23.402]. The S2 interface comes in three types: S2a, S2b and S2c. The latter two overlay the non-3GPP access network and do not impact it. S2a is a more converged solution that does impact nodes in the non-3GPP access network. In S2a, the non-3GPP access network is seen as trusted; the non-3GPP access network is therefore denoted as TNAN (Trusted Non-3GPP Access Network). Where the TNAN uses Wireless LAN (WLAN) as the radio technology towards the UEs, the TNAN is denoted as TWAN (Trusted WLAN Access Network). S2a over TWAN is now standardized in 3GPP [Chapter 16 of 3GPP TS 23.402].

FIG. 1 of the accompanying drawings is a schematic block diagram providing an architecture overview, illustrating a UE 2 connecting to a 3GPP domain 4 via a TNAN 6. The TNAN 6 comprises a Residential Gateway (RG) 8, an Access Node 10 and a gateway node denoted as a TNAN S2a Peer (TNSP) 12. The 3GPP domain 4 comprises one or more PDN Gateways (PGWs) 14. In a case where the TNAN is a TWAN 6, the gateway node in the TWAN 6 is denoted as a TWAN Access Gateway (TWAG) 12.

In S2a, there is a GPRS Tunnelling Protocol (GTP) or Proxy Mobile IP (PMIP) tunnel for each PDN connection between the TNSP or TWAG 12 (e.g. a BBF Border Network Gateway (BNG)) in the TNAN or TWAN 6 and the 3GPP PGW(s) 14. Each PDN connection is anchored in a 3GPP PGW 14. The UE receives one IP address for each PDN connection, and it is the PGW that assigns the address. Similarly, between the UE 2 and the TNSP or TWAG 12 a point-to-point link is provided in order to separate the traffic from the different UEs and PDN connections.

A point-to-point link can be considered to be a protocol that provides a logical direct connection between two networking nodes. A data frame sent from node A via a point-to-point link to node B will not pass a node C. Note that a "point-to-point link" is a logical concept and can be implemented in several ways. The network between the UE 2 and the TNSP or TWAG 12 would generally be Ethernet based. Nodes intermediate the UE 2 and the TNSP 12 do forced-forwarding towards the TNSP 12 on L2 (Ethernet). The TNSP 12 sends downstream traffic targeted for the UE 2 as unicast on L2, even if that traffic is multicast/broadcast on L3 (IP).

Such an implementation imposes a limited impact on the UE 2 and the existing TNAN or TWAN infrastructure (in particular when TNAN or TWAN is defined by BBF). More importantly, there is no impact on the UE 2 if the UE 2 only has one default PDN connection. The TNSP or TWAG 12 can distinguish the different PDN connections based on UE MAC (Media Access Control) address combined with the PDN connection IP address that was assigned to the UE 2.

There are other ways to implement a point-to-point link between the UE 2 and TNSP 12. Examples are: a L3 tunnel (e.g. IPsec or IP-in-IP), a L2 tunnel (e.g. L2TP), and so on. However, all of these tend to have a greater impact on the UE 2 or the TNAN infrastructure.

The present applicant has appreciated a problem with the above-described architecture. In particular, it has been appreciated that there could be a situation where a set of one or more PGWs assign the same IP address for different PDN connections. This could occur where, for example, there are two PDNs connections relating respectively to two closed corporate networks, each with their own addressing scheme. Each PDN might be served by a different PGW, and each PGW might be managed by a different operator. The 3GPP domain(s) and the UE are designed to handle such an overlap without any issue. However, the problem is that the TNSP or TWAG will get confused; it will no longer be able to map upstream traffic to the correct GTP/PMIP tunnel.

It should be noted that the likelihood of such a problem occurring in a real deployment is small; most UEs will only use a single PDN connection, and the IP addressing schemes of different PDNs will in most cases not overlap. However, the problem can and will occur without a solution, and the present applicant has appreciated the desirability of addressing this issue.

There are typically two scenarios where such a problem of overlapping or clashing addresses when a UE access a 3GPP core network via a non-3GPP access network can arise. In both scenarios, a dual-radio UE is assumed; the UE has one radio interface for the 3GPP access (e.g. LTE), and one radio interface for the non-3GPP access (e.g. WiFi).

A first scenario is illustrated schematically in FIG. 2 of the accompanying drawings. In the first scenario, the UE 2 is initially connected to a 3GPP access 16, and already has overlapping addresses in the 3GPP access 16, or has an address in the 3GPP access 16 which overlaps with an address already assigned in the non-3GPP access 6. As mentioned previously, overlapping addresses in the 3GPP access presents no problem; 3GPP by design allows for such a situation. However, a problem occurs when the UE now does a handover to the non-3GPP access 6. This can be considered as the first scenario.

In a second scenario, the UE 2 is attached to a non-3GPP access 6 and opens a new PDN connection. The new address for that PDN connection overlaps with an existing address in the second scenario.

The present applicant has appreciated the desirability of addressing the above-identified issues, and particularly in a manner that (a) does not tend to pose restrictions on the deployment of S2a in certain circumstances; and/or (b) enables the UE to distinguish between downlink IP multicasts if these come from different PDNs.

SUMMARY

A method is proposed here relating to the connecting of a mobile terminal or UE to a 3GPP core network, such as the Evolved Packet Core, via a non-3GPP access network, such as a BBF network or domain. The method finds use in a Fixed Mobile Convergence scheme, where the mobile terminal or UE connects to the 3GPP core network through a fixed residential network, for example using WiFi.

A UE can attach to a non-3GPP access network and connect to one or more PDNs via a 3GPP core network. Each PDN connection is anchored in a gateway node in the 3GPP core network (such as a PDN Gateway or PGW), and in a gateway node in the non-3GPP access network (such as a TNSP or TWAG or border gateway node or BGW; in the case where a BBF network is the non-3GPP access network, the BGW might be a BNG). A separate tunnel is established for each such PDN connection between the gateway node (e.g. BNG) in the non-3GPP access network and the gateway node (e.g. PGW) in the 3GPP core network.

A method is disclosed herein of establishing and/or using a plurality of packet data network connections between a user equipment and a 3GPP core network via a gateway node in a non-3GPP access network, in which a different device identifier is used for each packet data network connection of the plurality, or at least for each packet data network connection of the plurality that is associated with the same IP address, to distinguish between the packet data network connections of the plurality or to allow such a distinction to be made. The device identifier used to distinguish between the packet data network connections of the plurality is a device identifier associated with the user equipment, or a device identifier associated with the gateway node in the non-3GPP access network, or a combination of these. For example, the device identifier may be a MAC address, and the description below concentrates on such a case, but the description below make it clear that other types of device identifier are possible.

For brevity, the gateway node in the non-3GPP access network (e.g. BNG) can be referred to as the non-3GPP gateway node (e.g. BNG), and the gateway node in the 3GPP core network (e.g. PGW) can be referred to as the 3GPP gateway node (e.g. PGW).

The UE receives an IP address for each PDN connection. In this respect, a PDN connection can be considered to be an association between an UE and a PDN, represented for example by one IPv4 address and/or one IPv6 prefix. It is the gateway node (e.g. PGW) in the 3GPP core network that assigns the address. A PDN is identified by an Access Point Name (APN) and a PDN is accessed via the PGW. In this respect, the term "IP address" herein is intended to cover both an IPv4 address and an IPv6 prefix, and the like.

A method is particularly proposed here for use in establishing and/or using a plurality of packet data network or PDN connections between a UE and a 3GPP core network via a non-3GPP access network. The method comprises using a different MAC address for each PDN connection of the plurality, or at least for each PDN connection of the plurality that is associated with the same IP address, to distinguish between the PDN connections of the plurality or to allow such a distinction to be made.

Likewise, an apparatus is proposed for use in establishing and/or using a plurality of packet data network or PDN connections between a UE and a 3GPP core network via a non-3GPP access network. The apparatus is arranged to use a different MAC address for each PDN connection of the plurality, or at least for each PDN connection of the plurality that is associated with the same IP address, to distinguish between the PDN connections of the plurality or to allow such a distinction to be made.

The above-mentioned IP address associated with the PDN connection would typically be the IP address assigned to the UE (e.g. by the gateway node in the 3GPP core network); this is therefore referred to hereinbelow as the UE IP address.

For each PDN connection there may be a tunnel between a gateway node in the non-3GPP access network and a gateway node in the 3GPP core network, and a point-to-point connection between the UE and the gateway node in the non-3GPP access network. Messages sent over the point-to-point connection may be of a type to include respective MAC addresses of the source and destination devices (UE or gateway node in the non-3GPP access network). The point-to-point connection may be an L2 or Ethernet connection.

The MAC address used to distinguish between the PDN connections of the plurality could be a MAC address associated with the UE, or a MAC address associated with the gateway node in the non-3GPP access network, or a combination of these.

For example, it is described above with reference to FIG. 1 that the TNSP or TWAG 12 can distinguish the different PDN connections based on UE MAC address combined with the PDN connection IP address that was assigned to the UE 2. In previously-considered systems this assumes a fixed MAC address for the UE, such that the distinction between the different PDN connections for the UE is actually based on the IP address; this relies on a different IP address being assigned to each PDN connection. What is proposed herein relaxes or eliminates the requirement for different IP addresses to be assigned to the various PDN connections for a UE, because a distinction can instead be made between the various PDN connections based on MAC address (either of the UE 2 or the TNSP/TWAG 12 or both). Of course, where it can be ensured that different IP addresses will be associated with different respective PDN connections, then it is not necessary to use different MAC addresses for those particular PDN connections, though it is possible to use different MAC addresses in combination with different IP addresses.

In one example, the UE 2 uses a different MAC address for each PDN connection. The initial or first PDN connection could be based on the actual or pre-assigned MAC address for the UE, whilst subsequent PDN connections could be based on MAC addresses that are generated by the UE. These MAC addresses need not be globally unique. In the upstream, the TNSP or TWAG 12 can map each MAC address to a different GTP/PMIP tunnel, which solves the issue of clashing IP addresses. In the downstream, the TNSP or TWAG 12 can map each tunnel to a different MAC address. This solves the problem of downlink IP multicasts from different PDNs, as the UE 2 can now differentiate these based on destination MAC address.

In another example, the TNSP or TWAG 12 could instead use a different MAC address for each PDN connection.

This new approach does not impose any restrictions on the deployment of the solution. Although a consequence is that there is additional impact on the UE or the TNSP/TWAG, this is considered to be outweighed by the advantages provided in many scenarios.

As stated above, the method comprises using a different device identifier (e.g. MAC address) for each PDN connection of a plurality of PDN connections between a UE and a 3GPP core network via a non-3GPP access network, or at least for each PDN connection of the plurality that is associated with the same UE IP address, to distinguish between the PDN connections of the plurality or to allow such a distinction to be made. This may be considered in relation to a plurality of PDN connections involving the UE and a particular gateway node in the non-3GPP access network.

The step of using a different device identifier (e.g. MAC address) for each such PDN connection is performed both at the UE and in the non-3GPP access network.

In the context of what happens at the UE, the step of using a different device identifier (e.g. MAC address) for each PDN connection of the plurality may comprise determining (e.g. by generating or selecting) a different device identifier (e.g. MAC address) for each PDN connection of the plurality; in doing so this enables a distinction subsequently to be made between the PDN connections of the plurality. For each PDN connection of the plurality, this determination is made before that PDN connection is established.

The method performed at the UE may therefore comprise, for each of the plurality of packet data network connections to be established: (a) determining a device identifier for the user equipment that is different to the device identifier determined for the user equipment for any other packet data network connection of the plurality; (b) sending a request to establish the packet data network connection to the gateway node in the non-3GPP access network, including the device identifier determined in step (a) in the request, for example as the device identifier associated with the source of the request; and (c) establishing the packet data network connection.

Again in the context of what happens at the UE, the step of using a different device identifier (e.g. MAC address) for each PDN connection of the plurality may comprise the actual step of distinguishing between the PDN connections of the plurality using the different device identifiers (e.g. MAC addresses). This distinguishing step would be performed when the PDN connections have been established and when the UE is communicating over those PDN connections.

In the context of what happens at the UE and in the non-3GPP access network, in the case where the device identifier (e.g. MAC address) is generated in the non-3GPP access network and at the UE respectively, the step of using a different device identifier (e.g. MAC address) for each PDN connection of the plurality may comprise associating the device identifiers (e.g. MAC addresses) with the PDN connections at the time of establishing the PDN connections; in doing so this enables a distinction subsequently to be made between the PDN connections of the plurality.

The method performed at the UE may therefore comprise, for each of a plurality of data packets to be sent over a packet data network connection of the plurality: (d) determining which packet data network connection is to be used; (e) selecting the device identifier appropriate to the packet data network connection determined in step (d); and (f) including the device identifier selected in step (e) in the packet, for example as the device identifier associated with the source of the packet, and sending the packet over the packet data network connection.

The method performed at the UE may therefore comprise, for each of a plurality of data packets received over a packet data network connection of the plurality: (g) receiving the packet, the packet including within it a device identifier, for example as the device identifier associated with the destination of the packet; (h) determining the device identifier from the packet received in step (g); and (i) determining the packet data network connection based on the device identifier determined in step (h).

In the context of what happens at the non-3GPP access network, the step of using a different device identifier (e.g. MAC address) for each PDN connection of the plurality may comprise determining (e.g. by generating or selecting) a different device identifier (e.g. MAC address) for each PDN connection of the plurality; in doing so this enables a distinction subsequently to be made between the PDN connections of the plurality. For each PDN connection of the plurality, this determination is made before that PDN connection is established.

Again in the context of what happens in the non-3GPP access network, the step of using a different device identifier (e.g. MAC address) for each PDN connection of the plurality may comprise the actual step of distinguishing between the PDN connections of the plurality using the different device identifier (e.g. MAC addresses). This distinguishing step would be performed when the PDN connections have been established and when communications are taking place over those PDN connections via the non-3GPP access network.

The method performed at the gateway node in the non-3GPP access network may therefore comprise, for each of the plurality of packet data network connections to be established: (A) receiving a request to establish the packet data network connection including a device identifier associated with the user equipment; or receiving a request to establish the packet data network connection and determining a device identifier associated with the gateway node that is different to the device identifier determined for the gateway node for any other packet data network connection of the plurality; (B) establishing the requested packet data network connection; and (C) associating the device identifier with the packet data network connection established in step (B).

The method performed at the gateway node in the non-3GPP access network may therefore comprise, for each of a plurality of data packets to be sent over a packet data network connection of the plurality: (D) receiving the packet; (E)(i) if the packet is received from a user equipment, determining the appropriate tunnel to be used based on a device identifier included in the packet; or (E)(ii) if the packet is received from the 3GPP core network through a tunnel, determining a device identifier based on the tunnel through which the packet was received; and (F)(i) in the case of (E)(i), sending the packet through the tunnel determined in step (E)(i); or (F)(ii) in the case of (E)(ii), sending the packet to a user equipment over the connection appropriate to the device identifier determined in step (E)(ii).

As part of the tunnel setup procedure or separately, the non-3GPP gateway node (e.g. BNG) sends a message (e.g. PDN connection request) to the 3GPP gateway node (e.g. PGW).

The PDN connection request is accepted by the 3GPP core network. The 3GPP gateway node (e.g. PGW) allocates to the UE an IP address and sends it in a response message to the non-3GPP gateway node (e.g. BNG).

Then the non-3GPP gateway node (e.g. BNG) completes the tunnel setup procedure and sends the UE the allocated IP address. The allocated IP address may be included in a triggering response message. However, in the case where the trigger for tunnel setup is authentication rather than an explicit triggering message, then the allocated IP address might be carried to the UE for example in a router advertisement (IPv6) or by means of DHCP (IPv4).

The steps performed at the non-3GPP access network may be performed by a gateway node of the non-3GPP access network, and the steps performed at the 3GPP core network may be performed by a gateway node of the 3GPP core network.

The non-3GPP access network may be a BroadBand Forum, BBF, network.

The non-3GPP gateway node may be a Border Network Gateway node of the BBF network.

The 3GPP gateway node may be a PDN Gateway node of the 3GPP core network.

The present disclosure sets out steps performed at (and means or apparatus or a processor or a transmitter/receiver for performing those steps in) a node such as a gateway node in the non-3GPP access network and to steps performed at (and means or apparatus or a processor or a transmitter/receiver for performing those steps in) a UE.

An apparatus is also disclosed herein for use in establishing and/or using a plurality of packet data network connections between a user equipment and a 3GPP core network via a gateway node in a non-3GPP access network, the apparatus being arranged to use a different device identifier for each packet data network connection of the plurality, or at least for each packet data network connection of the plurality that is associated with the same IP address, to distinguish between the packet data network connections of the plurality or to allow such a distinction to be made, wherein the device identifier used to distinguish between the packet data network connections of the plurality is a device identifier associated with the user equipment, or a device identifier associated with the gateway node in the non-3GPP access network, or a combination of these.

A user equipment is also disclosed herein comprising such an apparatus, the user equipment being arranged, for each of the plurality of packet data network connections to be established, to: (a) determine a device identifier for the user equipment that is different to the device identifier determined for the user equipment for any other packet data network connection of the plurality; (b) send a request to establish the packet data network connection to the gateway node in the non-3GPP access network, including the device identifier determined in step (a) in the request, for example as the device identifier associated with the source of the request; and (c) establish the packet data network connection.

A user equipment is also disclosed herein comprising such an apparatus, the user equipment being arranged, for each of a plurality of data packets to be sent over a packet data network connection of the plurality, to: (d) determine which packet data network connection is to be used; (e) select the device identifier appropriate to the packet data network connection determined in step (d); and (f) include the device identifier selected in step (e) in the packet, for example as the device identifier associated with the source of the packet, and send the packet over the packet data network connection.

A user equipment is also disclosed herein comprising such an apparatus, the user equipment being arranged, for each of a plurality of data packets received over a packet data network connection of the plurality, to: (g) receive the packet, the packet including within it a device identifier, for example as the device identifier associated with the destination of the packet; (h) determine the device identifier from the packet received in step (g); and (i) determine the packet data network connection based on the device identifier determined in step (h).

A gateway node is also disclosed herein for use in a non-3GPP access network, the gateway node comprising such an apparatus and being arranged, for each of the plurality of packet data network connections to be established, to: (A) receive a request to establish the packet data network connection including a device identifier associated with the user equipment; or receive a request to establish the packet data network connection and determine a device identifier associated with the gateway node that is different to the device identifier determined for the gateway node for any other packet data network connection of the plurality; (B) establish the requested packet data network connection; and (C) associate the device identifier with the packet data network connection established in step (B).

A gateway node is also disclosed herein for use in a non-3GPP access network, the gateway node comprising such an apparatus and being arranged, for each of a plurality of data packets to be sent over a packet data network connection of the plurality, to: (D) receive the packet; (E)(i) if the packet is received from a user equipment, determine the appropriate tunnel to be used based on a device identifier included in the packet; or (E)(ii) if the packet is received from the 3GPP core network through a tunnel, determine a device identifier based on the tunnel through which the packet was received; and (F)(i) in the case of (E)(i), send the packet through the tunnel determined in step (E)(i); or (F)(ii) in the case of (E)(ii), send the packet to a user equipment over the connection appropriate to the device identifier determined in step (E)(ii).

A program is also proposed for controlling an apparatus to perform a method as herein proposed, or which, when loaded into an apparatus, causes the apparatus to become an apparatus as herein proposed. The program may be carried on a carrier medium. The carrier medium may be a storage medium. The carrier medium may be a transmission medium. An apparatus programmed by such a program is also envisaged, as is a storage medium containing such a program.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

DETAILED DESCRIPTION

As mentioned in the above summary, a method is proposed herein of distinguishing between (through establishing and/or using) a plurality of PDN connections between a UE and a 3GPP core network via a non-3GPP access network. The method comprises using a different device identifier (e.g. MAC address) for each PDN connection of the plurality, or at least for each PDN connection of the plurality that is associated with the same UE IP address, to distinguish between the PDN connections of the plurality or to allow such a distinction to be made. This may be considered in relation to a plurality of PDN connections involving the UE and a particular gateway node in the non-3GPP access network.

A schematic illustration will now be provided for the case in which UE MAC addresses are used as a basis for distinguishing between the PDN connections of the plurality. It will be appreciated that a similar scheme is possible for the case in which MAC addresses associated with the non-3GPP gateway node are used as a basis for distinguishing between the PDN connections of the plurality; since operation of this alternative would be clear to the skilled person from the schematic illustration below, it will not described in much detail herein, but a brief further explanation is nevertheless provided below. As is made clear below, it will also be appreciated that device identifiers other than MAC addresses can be used.

Figure 3:
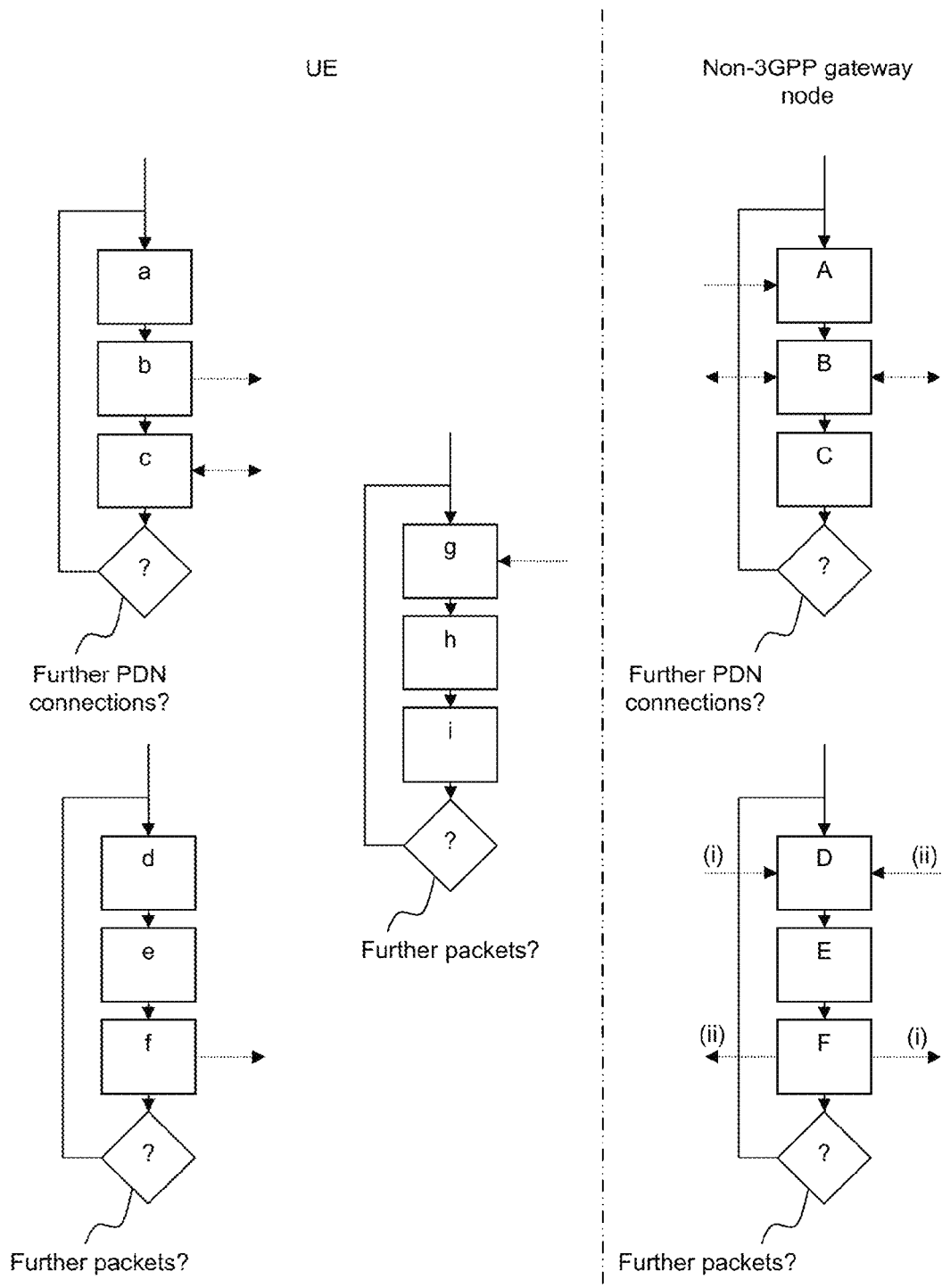
FIG. 3 is a flowchart illustrating schematically a method described herein.
Figure 4:
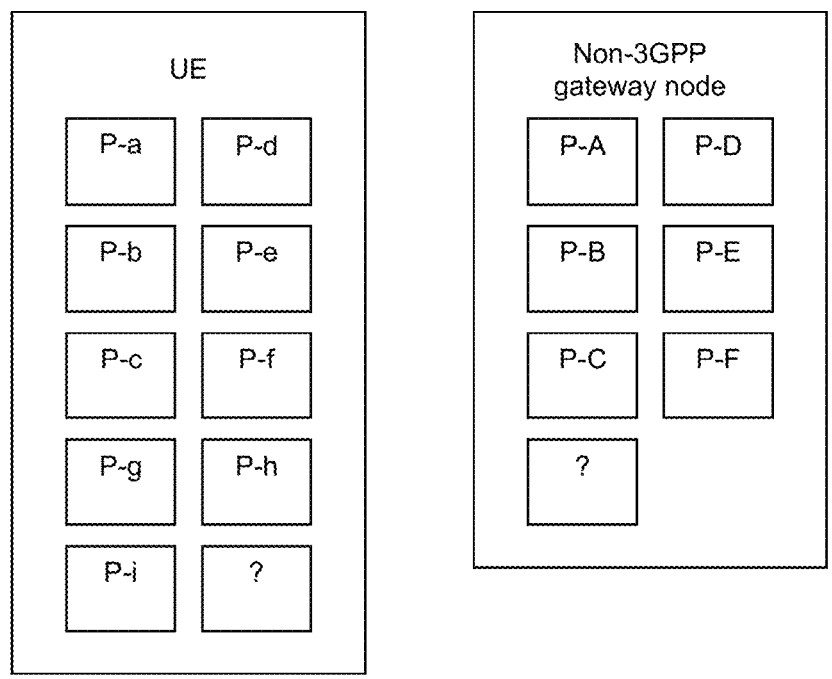
FIG. 4 is a schematic block diagram illustrating an apparatus described herein.

Steps performed at the UE are illustrated in the schematic flowchart of FIG. 3. Corresponding parts or components or processors or transmitter/receivers P-a to P-i of a UE, for performing respective steps (a) to (i), are illustrated in FIG. 4.

For each of a plurality of PDN connections to be established between the UE and a 3GPP core network via a gateway node in a non-3GPP access network, the following steps are performed at the UE:

(a) a UE MAC address is determined that is different to the UE MAC address determined for any other PDN connection of the plurality.

(b) a request to establish the PDN connection is sent to the gateway node in the non-3GPP access network, using the UE MAC address determined in step (a). The MAC address may be included in the request. For example, the MAC address may be included in the request as the source MAC address. The request may be a Dynamic Host Configuration Protocol (DHCP) request message, though it will be appreciated that some other protocol (such as the Extensible Authentication Protocol, EAP, or even some new protocol) can be used to carry the MAC address.

(c) the PDN connection is established.

Once the PDN connections of the plurality have been established, for each of a plurality of data packets to be sent over a PDN connection of the plurality, the following steps are performed at the UE:

(d) determine which PDN connection is to be used.

(e) select the MAC address appropriate to the PDN connection determined in step (d).

(f) include the MAC address selected in step (e) in the packet, for example as the source MAC address, and send the packet over the PDN connection.

For each of a plurality of data packets received over a PDN connection of the plurality, the following steps are performed at the UE:

(g) receive the packet (from the non-3GPP gateway node), including within it a MAC address, for example as the destination MAC address.

(h) determine the MAC address from the packet received in step (g).

(i) determine the PDN connection based on the MAC address determined in step (h).

Steps performed at the gateway node in the non-3GPP access network are illustrated in the schematic flowchart of FIG. 3. Corresponding parts or components or processors or transmitter/receivers P-A to P-F of a gateway node in the non-3GPP access network, for performing respective steps (A) to (F), are illustrated in FIG. 4.

For each of a plurality of PDN connections to be established between the UE and the 3GPP core network via the gateway node in the non-3GPP access network, the following steps are performed at the gateway node:

(A) the request sent by the UE in step (b) is received. (Alternatively, in a case where it is MAC addresses of the non-3GPP gateway node that are being used to distinguish between PDN connections, in this step (A) a request is received to establish the packet data network connection and a device identifier associated with the non-3GPP gateway node is determined that is different to the device identifier determined for the non-3GPP gateway node for any other packet data network connection of the plurality.)

(B) the requested PDN connection is established. The PDN connection includes a tunnel (e.g. GTP or PMIP) between the gateway node and a gateway node in the 3GPP core network, and a connection between the gateway node and the UE. This involves communicating with the 3GPP core network to establish the tunnel for the PDN connection between the non-3GPP access network and the 3GPP core network and to assign an IP address for the tunnel (the 3GPP core network is responsible for assigning the IP address). The tunnel is associated with a PDN connection between the UE and a PDN.

(C) the MAC address is associated with the PDN connection.

Once the PDN connections of the plurality have been established, for each of a plurality of data packets to be sent over a PDN connection of the plurality, the following steps are performed at the gateway node in the non-3GPP access network:

(D) receive the packet.

(E)(i) if the packet is received from a UE, determine the appropriate tunnel to be used based on the MAC address in the packet; or (E)(ii) If the packet is received from the 3GPP core network through a tunnel, determine a MAC address based on the tunnel through which the packet was received.

(F)(i) in the case of (E)(i) above, send the packet through the tunnel determined in step (E)(i); or (F)(ii) in the case of (E)(ii) above send the packet to a UE over the connection appropriate to the MAC address determined in step (E)(ii).

In one example, the UE 2 uses a different MAC address for each PDN connection. The initial or first PDN connection could be based on the actual or pre-assigned MAC address for the UE, whilst subsequent PDN connections could be based on MAC addresses that are generated by the UE. These MAC addresses need not be globally unique. In the upstream, the TNSP or TWAG 12 can map each MAC address to a different GTP/PMIP tunnel. In the downstream, the TNSP or TWAG 12 can map each tunnel to a different MAC address. In another example, the TNSP or TWAG 12 could instead use a different MAC address for each PDN connection.

Figure 5:
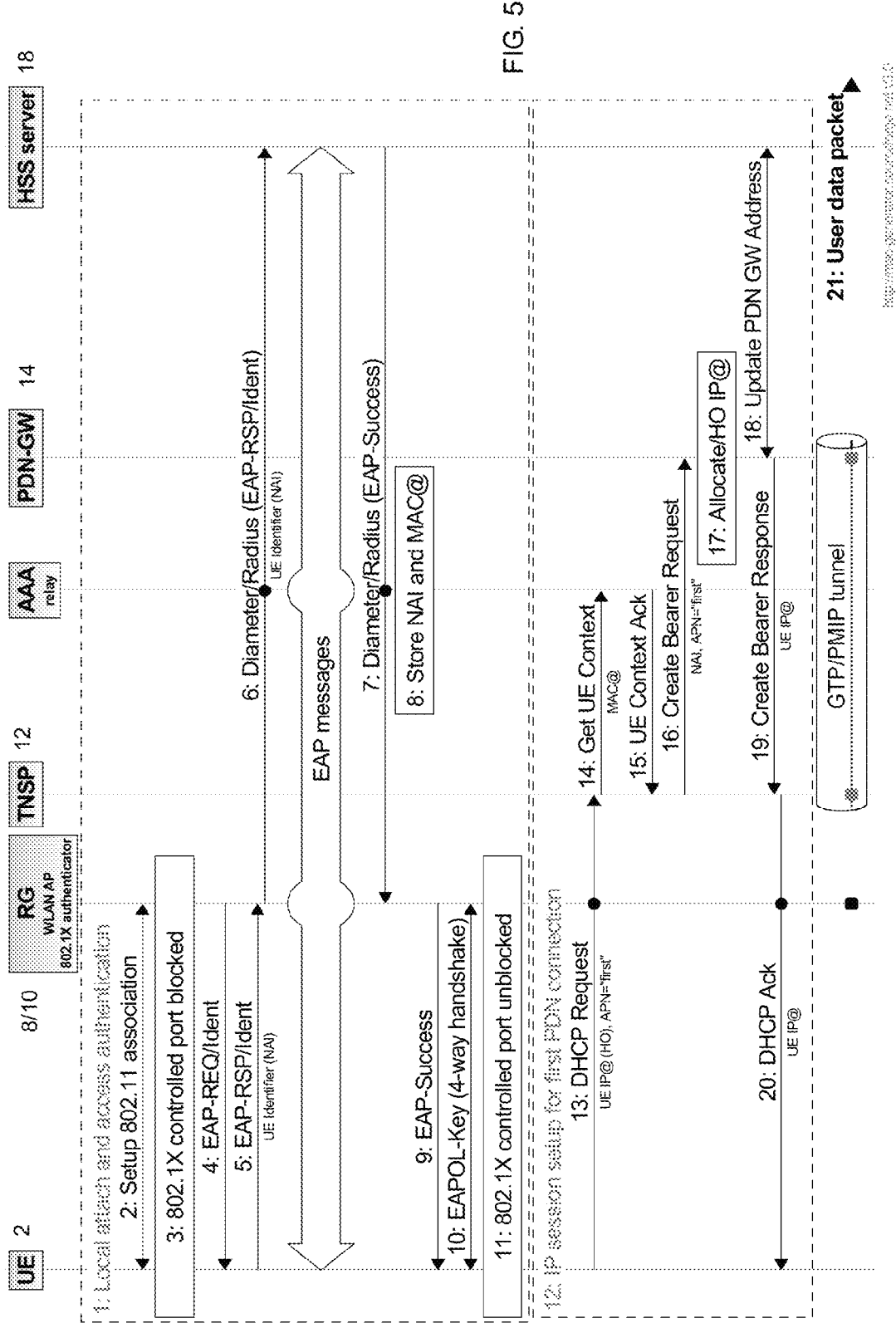
FIG. 5 is an illustrative diagram showing a UE attaching via WiFi to an initial PDN connection.

FIG. 5 is an example of a flow chart for the setup of the initial PDN connection for the UE 2. This PDN connection is now routed via WiFi (the RG 8/10 contains the WiFi access point) and might have been handed over from the LTE access.

Steps 2 to 11 relate to the attach to WiFi and the authentication of the UE 2. In this example, authentication is performed with IEEE 802.1X between the UE 2 and Access Point (AP) 8/10 (other means are also possible). As defined in 3GPP, the end-to-end authentication protocol between UE 2 and HSS 18 is EAP. In this particular example, authentication signaling is relayed via a AAA server in the TNAN.

Steps 13 to 20 relate to the actual setup of the PDN connection. In this example DHCP is used between the UE 2 and the TNSP 12 (though as also mentioned above, some other means are also possible, e.g. EAP or IEEE 802.11u). DHCP is used to carry an APN (Access Point Name) string, which indicates to which PDN the UE 2 is requesting to connect. In steps 14 and 15, the TNSP 12 queries the UE profile that was stored in the AAA as part of the authentication. The UE profile includes, for example, a list of APNs this UE 2 is entitled to attach to, and for each APN the PGW 14 that needs to be contacted in step 16.

When the UE attaches to WiFi, it needs to obtain an IP address for a PDN connection (abbreviated to IP@). It can either do a new attach, or a handover attach. Handover is abbreviated to HO. In the HO scenario, the UE does a HO from LTE/3G to WiFi. In order for the network to distinguish between a new attach and a HO attach, the UE sends (in the HO case only) its LTE/3G IP@ in the DHCP request (this is denoted as "UE IP@ (HO)" in the DHCP Request message 13 of FIG. 5). If all goes well, the DHCP reply will then return the same address, so that the UE can keep its existing address for this PDN connection.

Figure 6:
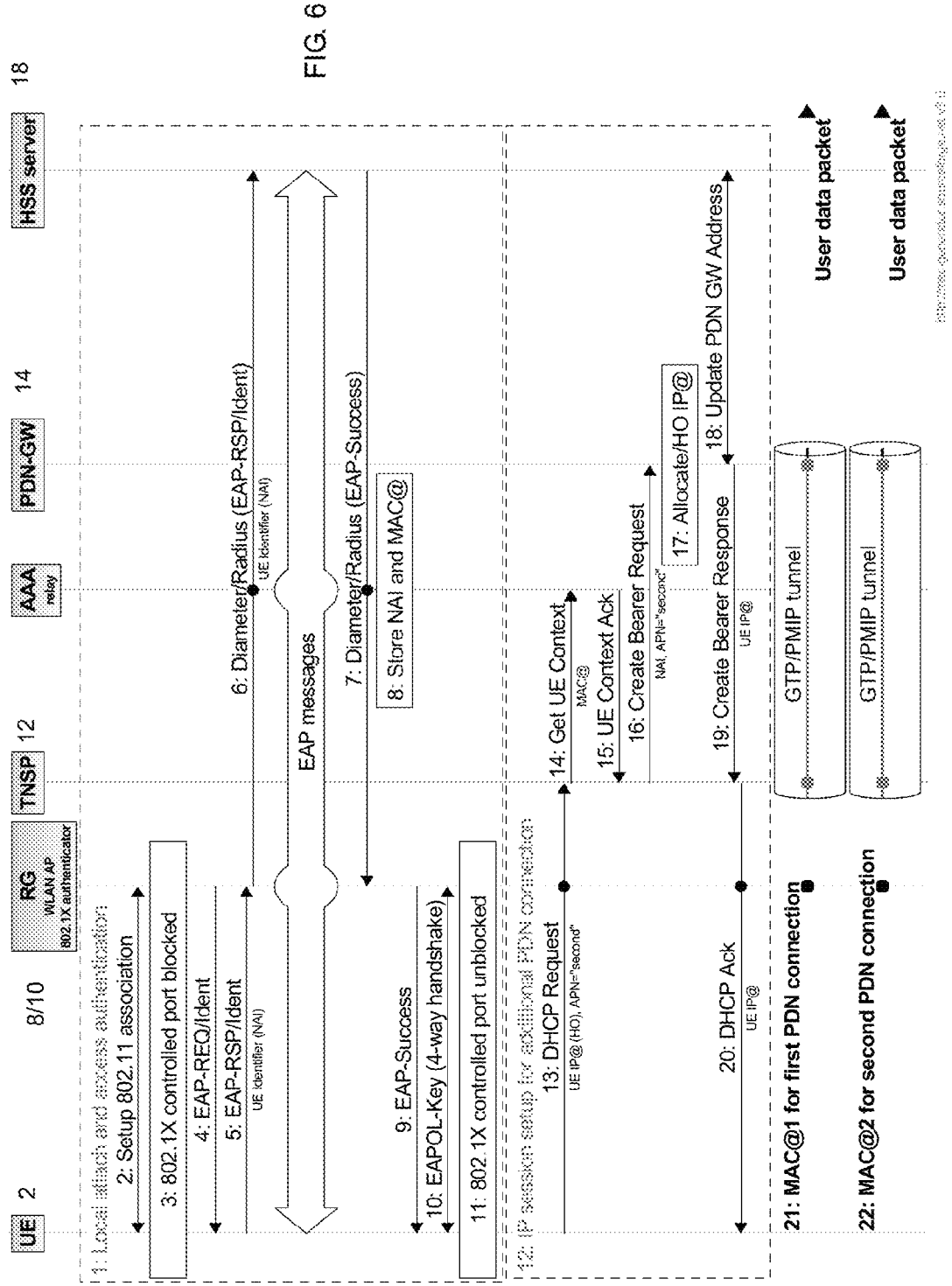
FIG. 6 is an illustrative diagram showing a UE attaching via WiFi to an additional PDN connection.

Assuming the initial/handover attach from FIG. 5, attach to an additional PDN connection is very similar when the UE 2 uses a different MAC address for that PDN connection. This is illustrated in the flowchart of FIG. 6.

In steps 2 to 11, as this UE 2 already has an IEEE 802.11 association setup for the initial attach, and already is authenticated, some optimizations might be possible if the same UE 2 now does an additional attach.

For each additional PDN connection, the UE 2 uses a different MAC address. The UE 2 could be pre-configured with a set of MAC addresses; however that would limit the deployment of the solution. A more scalable approach would be to use virtual MAC addresses. Generating and validating a new virtual MAC address is a common technique used in virtual machines (e.g. VMware). Within the context of a UE attaching via S2a, globally unique MAC addresses are not required. As there is a point-to-point link between the UE 2 and TNSP 12, the UE 2 only needs ensure that the MAC address is unique on that point-to-point link. For the first PDN connection, the UE 2 can simply use the (globally unique) MAC address of the WiFi interface. As part of the first attach, the UE 2 also learns the MAC address of the TNSP 12 side of the point-to-point link. Based on this information, the UE 2 can generate a new virtual MAC address.

Figure 1:
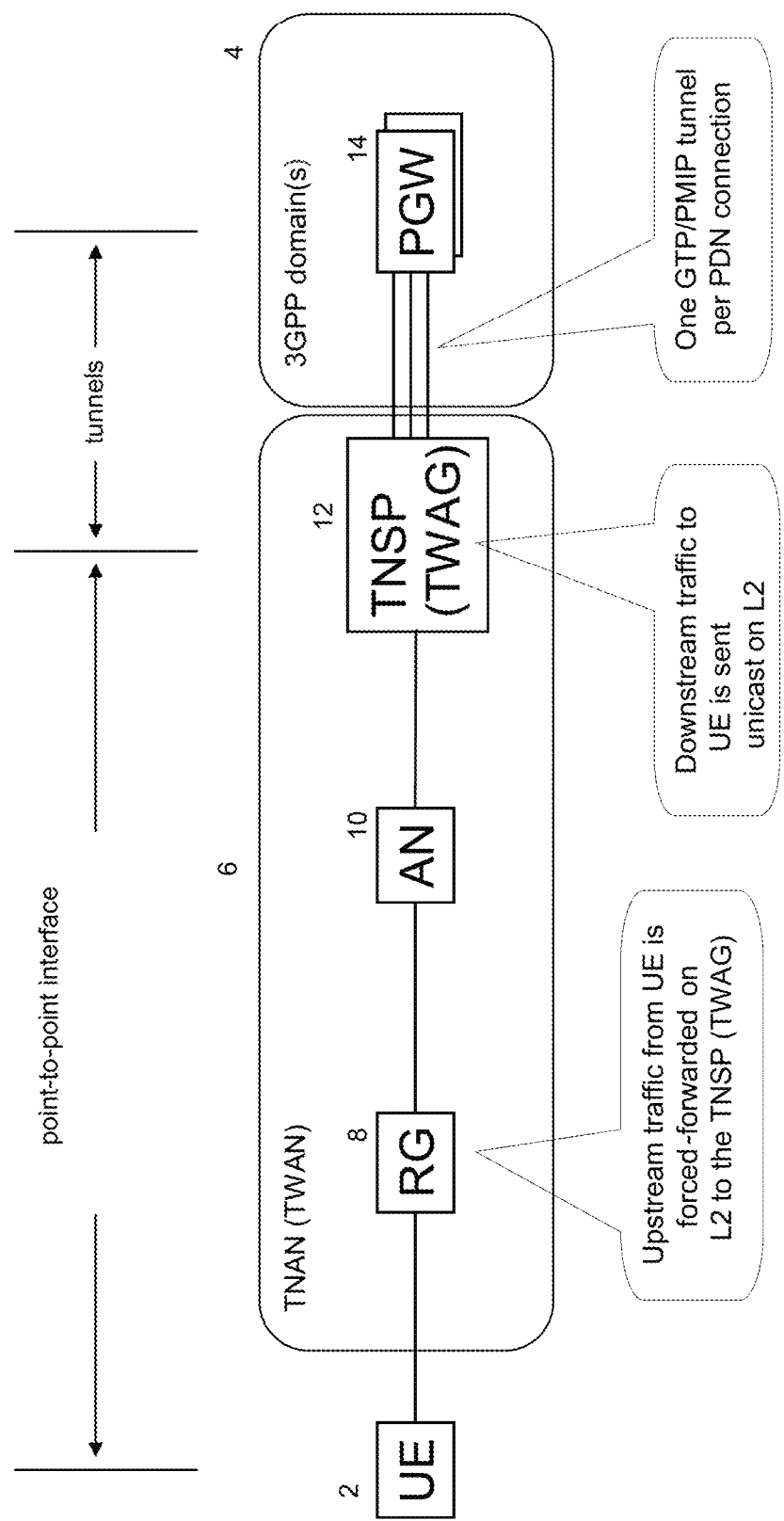
FIG. 1, discussed hereinbefore, is a schematic block diagram providing an architecture overview in which point-to-point links are provided between UE and TNSP, and tunnels between TNSP and PGW.
Figure 2:
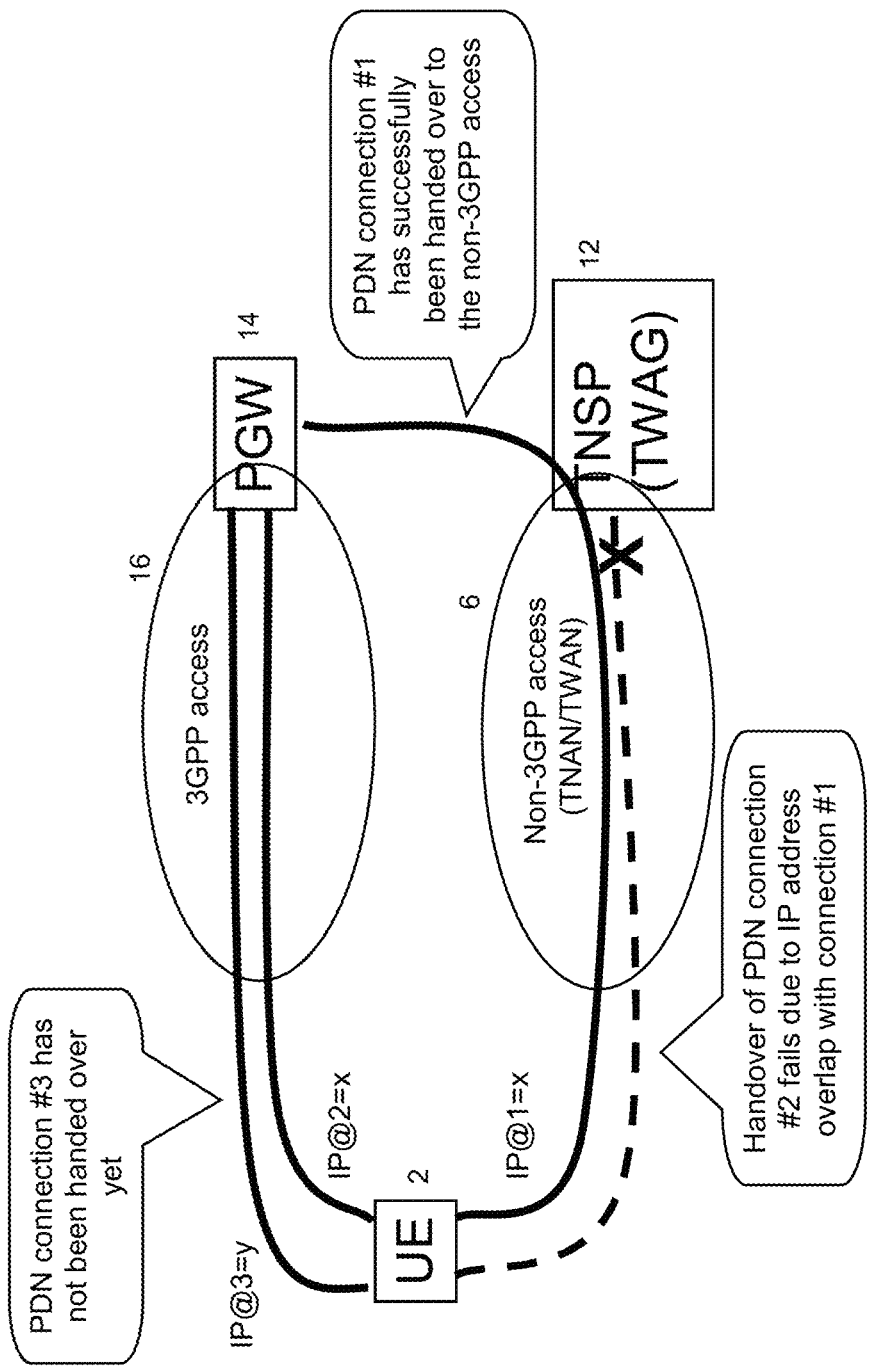
FIG. 2, also discussed hereinbefore, is a schematic illustration of a UE handing over three PDN connections from a 3GPP access to a non-3GPP access.

Generation or selection of the MAC address would typically occur before step 2; all signalling from the UE 2 would then be using the new MAC address. Since in this example all signalling to/from the UE 2 is Ethernet based (see FIG. 1 and the associated text), this means that all signals include a source and destination MAC address. Therefore, all signalling to/from the UE 2 in FIG. 5 uses MAC@1 and all signalling to/from the UE 2 in FIG. 6 uses MAC@2. The only exception is signalling 21 in FIG. 6, which uses MAC@1 specifically to distinguish the associated PDN connection from the PDN connection associated with MAC@2.

For example, typically the 48-bit MAC address consists of a 24-bit Organizationally Unique Identifier (OUI) plus a 24-bit Network Interface Controller (NIC). The OUI bits are unique to the manufacturer of the WiFi interface. The manufacturer assigns the NIC bits for this particular piece of equipment. The NIC bits are unique within the scope of the OUI. For an S2a UE to generate a unique MAC address, the UE could take the OUI and randomly generate a new NIC, such that the new MAC address is different from any other known MAC address on this point-to-point link.

The detailed technique as described with reference to FIGS. 5 and 6 is intended to correspond closely and fit within the schematic representation as described with reference to FIGS. 3 and 4. In particular, with these examples it is the MAC address of the UE that is used to distinguish between the PDN connections of the plurality or to allow such a distinction to be made. However, as mentioned previously, it will be appreciated that it is also possible that the MAC address of the non-3GPP gateway node is used to distinguish between the PDN connections of the plurality or to allow such a distinction to be made. With such an alternative, a different MAC address for non-3GPP gateway node would be generated (or selected) for each PDN connection of the plurality. A combination of these alternatives is also possible. An example sequence in the case where the MAC address of the non-3GPP gateway node is used to distinguish between the PDN connections is as follows: (1) the user equipment (e.g. UE) requests a new PDN connection e.g. via a new control protocol; (2) the non-3GPP gateway node (e.g. TWAG) generates a new device identifier (e.g. MAC address); (3) the non-3GPP gateway node (e.g. TWAG) sets up tunnel to the 3GPP gateway node (e.g. PGW); and (4) the non-3GPP gateway node (e.g. TWAG) acknowledges the request to user equipment (e.g. UE) and includes the new device identifier (e.g. MAC address) in the acknowledgement.

So, if the UE has only one MAC address, and the non-3GPP gateway node one per PDN connection, then the distinction can be made just as well. For uplink traffic (from the UE towards the 3GPP core network), for a packet transmitted along the point-to-point link with the non-3GPP gateway node, the UE would use a destination MAC address for the non-3GPP gateway node that is appropriate to the PDN connection. When received at the non-3GPP gateway node, the non-3GPP gateway node can differentiate between tunnels based on that MAC address.

In the downlink direction (from the 3GPP core network to the UE), the non-3GPP gateway node would use a source MAC address for a packet transmitted along the point-to-point link with the UE that is appropriate to the tunnel through which the packet was received. When that packet is received by the UE, the UE can differentiate based on that MAC address.

A technique as described herein does not tend to impose restrictions on the deployment of the S2a solution. In particular, it becomes possible for a UE to have clashing IP addresses on the non-3GPP access (e.g. WiFi radio interface) side—just as 3GPP supports on the LTE radio interface side. Also, it becomes possible for a UE to differentiate IP multicasts from different PDN connections.

It will be appreciated that operation of one or more of the above-described components can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components. Such an operating program can be stored on a computer-readable medium, or could, for example, be embodied in a signal such as a downloadable data signal provided from an Internet website. The disclosure is to be interpreted as covering an operating program by itself, or as a record on a carrier, or as a signal, or in any other form.

Figure 7:
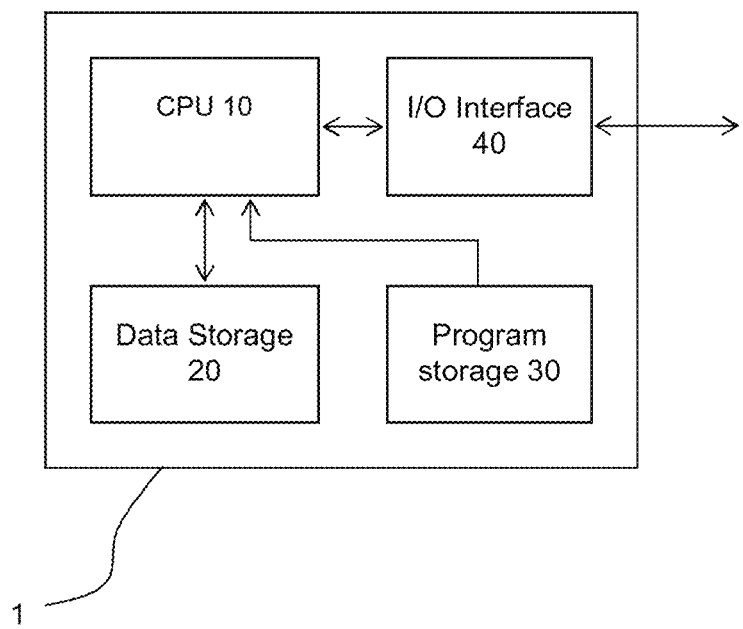
FIG. 7 is a schematic illustration of a node in which a technique described herein can be implemented.

FIG. 7 is a schematic illustration of a node 1 in which a technique described herein can be implemented. A computer program for controlling the node 1 to carry out a method as described herein is stored in a program storage 30. Data used during the performance of a method as described herein is stored in a data storage 20. During performance of a method as described herein, program steps are fetched from the program storage 30 and executed by a Central Processing Unit (CPU) 10, retrieving data as required from the data storage 20. Output information resulting from performance of a method as described herein can be stored back in the data storage 20, or sent to an Input/Output (I/O) interface 40, which may comprise a transmitter for transmitting data to other nodes, as required. Likewise, the Input/Output (I/O) interface 40 may comprise a receiver for receiving data from other nodes, for example for use by the CPU 10.

The appended signaling diagrams can be considered not only to depict a series of messages exchanged and method steps performed by the various nodes, but also to depict apparatus for exchanging those messages or performing those method steps. In addition, for the sake of completeness, any message which is shown or described as being sent from node A to node B implicitly includes the step of node A sending the message as well as the step of node B receiving the message, and means at nodes A and B for performing those steps.

It will be appreciated by the person of skill in the art that various modifications may be made to the above described embodiments without departing from the scope of the present disclosure. For example, it will be readily appreciated that although the above embodiments are described with reference to parts of a 3GPP core network, the technique described herein will also be applicable to like networks, such as a successor of the 3GPP core network, having like functional components. For example, the term UE is to be interpreted as covering any device.

Furthermore, the term MAC address is not intended to be limiting to any one particular standard, but is intended to cover any type of (supposedly unique) identifier for a device or a network interface relating to a device. The term "device identifier" can therefore be used in place of "MAC address", where a device identifier can be considered to be an identifier for (or associated with) a device or an identifier for (or associated with) a network interface relating to (or associated with) the device. For example, in an embodiment of the present invention it is possible that Virtual Local Area Network (VLAN) IDs are used instead of MAC addresses to differentiate between PDN connections, with every PDN connection being allocated a unique VLAN ID; the MAC header could then be extended with a "1Q" header (refer to the networking standard IEEE 802.1Q). In such an embodiment, a VLAN ID can be considered to be an identifier of a network interface relating to a device, or even just as an identifier for (i.e. relating to or associated with) a device.

Likewise, the present disclosure is not to be understood as being restricted to a non-3GPP access network such as the BBF, but is applicable to any non-3GPP access network. Therefore, in particular, the terms 3GPP and BBF and associated or related terms used in the above description and in the appended drawings are to be interpreted accordingly. The technique described herein is also applicable in the context of SaMOG, and in particular the non-3GPP access network described herein is also intended to cover an access defined by the WiFi Alliance.

Figure 8:
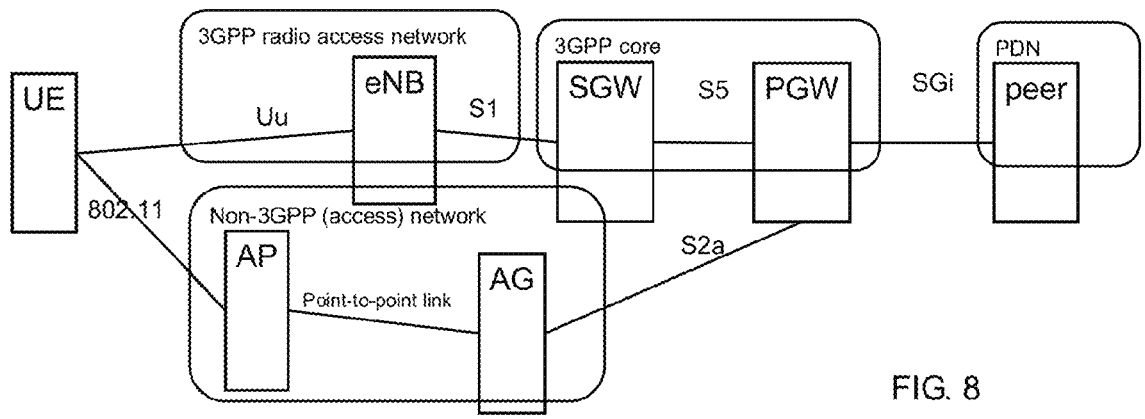
FIG. 8 is a schematic illustration of an architecture having separate 3GPP and non-3GPP access networks.

Furthermore, it is to be appreciated that the FMC work started off with an architecture having a 3GPP core network and a separate non-3GPP access network such as is illustrated in FIG. 8. However, possibilities are now being considered to incorporate WiFi into the 3GPP radio access network, leading to an architecture illustrated in FIGS. 9 and 10.

Figure 9:
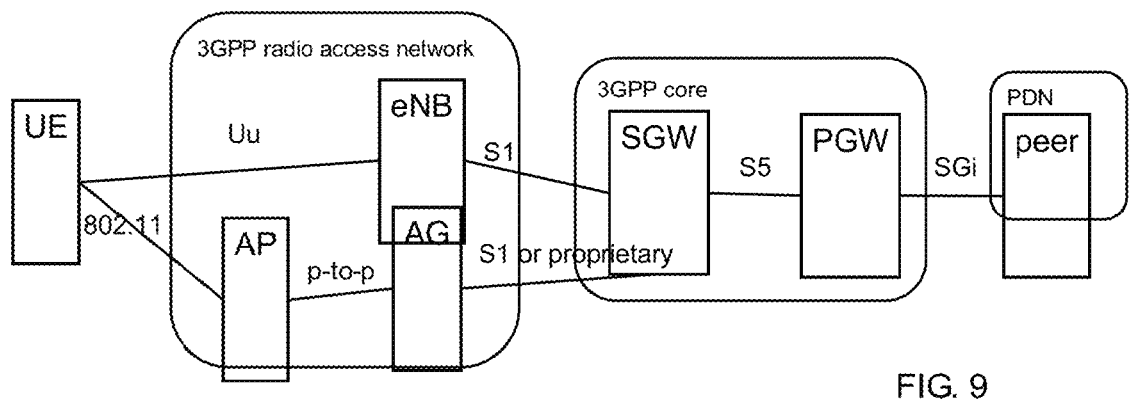
FIG. 9 is a schematic illustration of an alternative architecture in which the non-3GPP access network is incorporated into the 3GPP access network.

In the architecture of FIG. 9, the AG or Access Gateway is now inside the 3GPP RAN. There is still a point-to-point link between the AP and AG, just as in FIG. 8. (Note that network nodes can generally be considered as functional entities, so that they may be split or co-located—e.g. the PGW and SGW may be co-located, the Evolved Node B (eNB) and AG may be co-located, and so on.)

Figure 10:
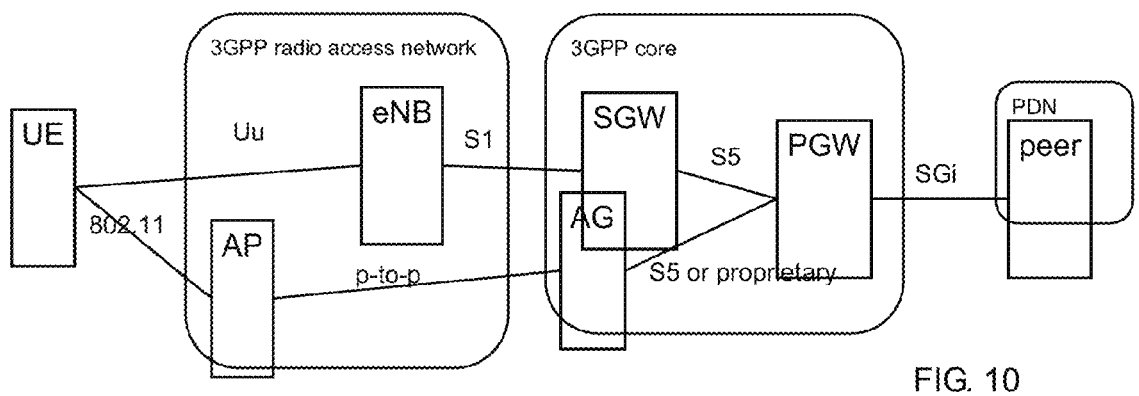
FIG. 10 is a schematic illustration of an alternative architecture in which the non-3GPP access network is incorporated into the 3GPP access network.

In the architecture of FIG. 10, the AG is now inside the 3GPP core. There is still a point-to-point link between AP and AG, just as previously.

It is important to appreciate that the technique disclosed herein is equally applicable to the architectures of FIGS. 9 and 10, and therefore the term "non-3GPP access network" is to be interpreted accordingly, i.e. covering both a separate non-3GPP access network and a non-3GPP access network effectively incorporated into or considered in some sense as being part of the 3GPP access network. The non-3GPP access bypasses the 3GPP access provided by way of the eNB. Likewise, the term "non-3GPP gateway node" used herein is to be interpreted as covering the architecture of FIG. 10. As such, "gateway node in the non-3GPP access network" or "non-3GPP gateway node" can be substituted simply by "gateway node" where appropriate, and "non-3GPP access network" can be substituted simply by "access network" where appropriate.

FIGS. 5 and 6 were generated using the msc-generator tool (where msc stands for Message Sequence Chart; see http://sourceforge.net/projects/msc-generator/). In case any part of these figures is not legible, the msc source code is included as follows:

FIG. 5:

```
msc=Dinand {
background.color=white;
UE [label="\bUE"],
RGW [label="'\bRG\n\sWLAN AP\n802.1X authenticator\n"],
BNG [label="'\bTNSP"],
AAA [label="'\bAAA\n\-relay"],
PDN [label="'\bPDN-GW"],
HSS [label="'\bHSSserver"];
++:Local attach and access authentication [ ]{
  UE<->RGW: Setup 802.11 association;
  UE--RGW: 802.1X controlled port blocked;
  RGW->UE: EAP-REQ/Ident;
  UE->RGW: EAP-RSP/Ident\n\-UE Identifier (NAI);
  RGW->AAA->HSS: Diameter/Radius (EAP-RSP/Ident)\n\-UE
Identifier (NAI);
  block UE<->RGW-AAA-HSS: EAP messages [ ];
  HSS->AAA-RGW: Diameter/Radius (EAP-Success);
  AAA--AAA: Store NAI and MAC@;
  RGW->UE: EAP-Success;
  RGW<->UE: EAPOL-Key (4-way handshake);
  UE--RGW: 802.1X controlled port unblocked;
};
++: IP session setup for first PDN connection [ ] {
  UE->RGW-BNG: DHCP Request\n\-UE IP@ (HO), APN="first";
  BNG->AAA: Get UE Context\n\-MAC@;
  AAA->BNG: UE Context Ack;
  BNG->PDN: Create Bearer Request\n\-NAI, APN="first";
  PDN--PDN: Allocate/HO IP@;
  PDN<->HSS: Update PDN GW Address;
  BNG<-PDN: Create Bearer Response\n\-UE IP@;
  UE<-RGW-BNG: DHCP Ack\n\-UE IP@;
};
pipe BNG--PDN:GTP/PMIP tunnel [number=no]{
  UE->RGW-BNG-PDN-> [strong, number=yes]: \prUser data
packet;
};
}
```

FIG. 6:

```
msc=Dinand {
background.color=white;
UE [label="'\bUE"],
RGW [label="'\bRG\n\sWLAN AP\n802.1X authenticator\n"],
BNG [label="'\bTNSP"],
AAA [label="'\bAAA\n\-relay"],
PDN [label="'\bPDN-GW"],
HSS [label="'\bHSS server"];
++:Local attach and access authentication [ ]{
  UE<->RGW: Setup 802.11 association;
  UE--RGW: 802.1X controlled port blocked;
  RGW->UE: EAP-REQ/Ident;
  UE->RGW: EAP-RSP/Ident\n\-UE Identifier (NAI);
  RGW->AAA->HSS: Diameter/Radius (EAP-RSP/Ident)\n\-UE
Identifier (NAI);
  block UE<->RGW-AAA-HSS: EAP messages [ ];
  HSS->AAA-RGW: Diameter/Radius (EAP-Success);
  AAA--AAA: Store NAI and MAC@;
  RGW->UE: EAP-Success;
  RGW<->UE: EAPOL-Key (4-way handshake);
  UE--RGW: 802.1X controlled port unblocked;
};
++: IP session setup for additional PDN connection [ ] {
  UE->RGW-BNG: DHCP Request\n\-UE IP@ (HO), APN="second";
  BNG->AAA: Get UE Context\n\-MAC@;
  AAA->BNG: UE Context Ack;
  BNG->PDN: Create Bearer Request\n\-NAI, APN="second";
  PDN--PDN: Allocate/HO IP@;
  PDN<->HSS: Update PDN GW Address;
  BNG<-PDN: Create Bearer Response\n\-UE IP@;
  UE<-RGW-BNG: DHCP Ack\n\-UE IP@;
};
pipe BNG--PDN:GTP/PMIP tunnel [number=no]{
  UE->RGW-BNG-PDN-> [strong, number=yes]: \p1MAC@1 for first
PDN connection\n\prUser data packet;
};
pipe BNG--PDN:GTP/PMIP tunnel [number=no]{
  UE->RGW-BNG-PDN-> [strong, number=yes]: \p1MAC@2 for
```

-continued

```
second PDN connection\n\prUser data packet;
};
}
```

The invention claimed is:

1. A method of establishing and/or using a plurality of packet data network connections between a user equipment and a 3GPP core network via a gateway node in a non-3GPP access network, the method comprising:
  using a different device identifier for at least each packet data network connection of the plurality of packet data network connections that are concurrently associated with the same IP address to distinguish between the packet data network connections of the plurality of concurrent packet data network connections or to allow such a distinction to be made,
  wherein the IP address associated with the packet data network connection is the IP address assigned to the user equipment,
  wherein one or more of the different device identifiers used to distinguish between the packet data network connections comprises a Media Access Control address device identifier associated with the gateway node in the non-3GPP access network.

2. The method as claimed in claim 1, wherein, for each packet data network connection there is a tunnel between the gateway node in the non-3GPP access network and a gateway node in the 3GPP core network, and a point-to-point connection between the user equipment and the gateway node in the non-3GPP access network.

3. The method as claimed in claim 2, wherein the point-to-point connection is an L2 or Ethernet connection.

4. The method as claimed in claim 1, wherein messages sent between the user equipment and the gateway node in the non-3GPP access network include respective device identifiers of the source and destination devices of the point-to-point connection, the source and destination devices respectively being the user equipment and the gateway node in the non-3GPP access network, or vice versa.

5. The method as claimed in claim 4, wherein the IP address associated with the packet data network connection is the IP address assigned to the user equipment by the gateway node in the 3GPP core network.

6. The method as claimed in claim 1, wherein the step of using a different device identifier for each packet data network connection of the plurality comprises determining a different device identifier for each packet data network connection of the plurality, and in doing so enabling a distinction subsequently to be made between the packet data network connections of the plurality.

7. The method as claimed in claim 1, wherein the step of using a different device identifier for each packet data network connection of the plurality comprises distinguishing between the packet data network connections of the plurality using the different device identifiers.

8. The method as claimed in claim 1, wherein the step of using a different device identifier for each packet data network connection of the plurality comprises associating the device identifiers with the packet data network connections at the time of establishing the packet data network connections, and in doing so enabling a distinction subsequently to be made between the packet data network connections of the plurality.

9. The method as claimed in claim 1, comprising at the user equipment, for each of a plurality of data packets to be sent over a packet data network connection of the plurality:
  determining which packet data network connection is to be used;
  selecting the device identifier appropriate to the packet data network connection determined to be used; and
  including the selected device identifier in the packet, and sending the packet over the packet data network connection.

10. The method as claimed in claim 1, comprising at the user equipment, for each of a plurality of data packets received over a packet data network connection of the plurality:
  receiving the packet, the packet including within it a device identifier;
  determining the device identifier from the received packet; and
  determining the packet data network connection based on the determined device identifier.

11. The method as claimed in claim 1, comprising at the gateway node in the non-3GPP access network, for each of the plurality of packet data network connections to be established:
  receiving a request to establish the packet data network connection and determining a device identifier associated with the gateway node in the non-3GPP access network that is different to the device identifier determined for the gateway node for any other packet data network connection of the plurality;
  establishing the requested packet data network connection; and
  associating the device identifier with the packet data network connection.

12. The method as claimed in claim 1, comprising at the gateway node in the non-3GPP access network, for each of a plurality of data packets to be sent over a packet data network connection of the plurality:
  receiving the packet;
  if the packet is received from a user equipment:
    determining the appropriate tunnel to be used based on a device identifier included in the packet;
    sending the packet through the determined appropriate tunnel;
  if the packet is received from the 3GPP core network through a tunnel:
    determining a device identifier based on the tunnel through which the packet was received; and
    sending the packet to a user equipment over the connection appropriate to the determined device identifier.

13. The method as claimed in claim 1, further comprising maintaining the plurality of packet data network connections in parallel.

14. An apparatus for use in establishing and/or using a plurality of packet data network connections between a user equipment and a 3GPP core network via a gateway node in a non-3GPP access network, the apparatus comprising a processor and storage arranged to:
  use a different device identifier for at least each packet data network connection of the plurality of packet data connections that are concurrently associated with the same IP address,
  distinguish between the packet data network connections of the plurality of concurrent packet data connections or to allow such a distinction to be made, wherein the IP address associated with the packet data network connection is the IP address assigned to the user equipment, wherein one or more of the different device identifiers used to distinguish between the packet data network connections comprises a Media Access Control address device identifier associated with the gateway node in the non-3GPP access network.

15. The apparatus as claimed in claim 14, arranged, for each of a plurality of data packets to be sent over a packet data network connection of the plurality, to:

determine which packet data network connection is to be used;

select the device identifier appropriate to the determined packet data network connection; and include the selected device identifier in the packet, and send the packet over the packet data network connection.

16. The apparatus as claimed in claim 14, arranged, for each of a plurality of data packets received over a packet data network connection of the plurality, to:

receive the packet, the packet including within it a device identifier;

determine the device identifier from the received packet; and determine the packet data network connection based on the determined device identifier.

17. The apparatus as claimed in claim 14 arranged, for each of the plurality of packet data network connections to be established, to:

receive a request to establish the packet data network connection and determine a device identifier associated with the gateway node that is different to the device identifier determined for the gateway node for any other packet data network connection of the plurality;

establish the requested packet data network connection; and associate the device identifier with the established packet data network connection.

18. The apparatus as claimed in claim 14 arranged, for each of a plurality of data packets to be sent over a packet data network connection of the plurality, to:

receive a packet;

if the packet is received from a user equipment:
determine the appropriate tunnel to be used based on a device identifier included in the packet; and
send the packet through the determined tunnel;

if the packet is received from the 3GPP core network through a tunnel:
determine a device identifier based on the tunnel through which the packet was received; and
send the packet to a user equipment over the connection appropriate to the determined device identifier.

19. A non-transitory computer-readable storage medium containing a program configured, when executed by a processor, to establish and/or use a plurality of packet data network connections between a user equipment and a 3GPP core network via a gateway node in a non-3GPP access network, comprising:

use a different device identifier for at least each packet data network connection of the plurality of concurrent packet data network connections that are concurrently associated with the same IP address to distinguish between the packet data network connections of the plurality or to allow such a distinction to be made, wherein the IP address associated with the packet data network connection is the IP address assigned to the user equipment, wherein one or more of the different device identifiers used to distinguish between the packet data network connections comprises a Media Access Control address device identifier associated with the gateway node in the non-3GPP access network.

* * * * *

UNITED STATES PATENT AND TRADEMARK OFFICE
CERTIFICATE OF CORRECTION

PATENT NO. : 9,907,100 B2
APPLICATION NO. : 15/283824
DATED : February 27, 2018
INVENTOR(S) : Roeland Page 1 of 1

It is certified that error appears in the above-identified patent and that said Letters Patent is hereby corrected as shown below:

In the Specification

In Column 1, Line 8, delete "2012," and insert -- 2012, now Pat. No. 9,497,786, --, therefor.

Signed and Sealed this
Fifteenth Day of May, 2018

Andrei Iancu
*Director of the United States Patent and Trademark Office*